United States Patent
Obasih et al.

(10) Patent No.: US 10,658,717 B2
(45) Date of Patent: May 19, 2020

(54) BATTERY MODULE ACTIVE THERMAL MANAGEMENT FEATURES AND POSITIONING

(71) Applicant: CPS Technology Holdings LLC, New York, NY (US)

(72) Inventors: Kem M. Obasih, Brookfield, WI (US); Richard M. DeKeuster, Racine, WI (US)

(73) Assignee: CPS Technology Holdings LLC, New York, NY (US)

(*) Notice: Subject to any disclaimer, the term of this patent is extended or adjusted under 35 U.S.C. 154(b) by 1409 days.

(21) Appl. No.: 14/502,723

(22) Filed: Sep. 30, 2014

(65) Prior Publication Data

US 2016/0093934 A1 Mar. 31, 2016

(51) Int. Cl.
*H01M 10/0525* (2010.01)
*H01M 10/6563* (2014.01)
*H01M 10/6556* (2014.01)
*H01M 10/613* (2014.01)
*H01M 10/625* (2014.01)
(Continued)

(52) U.S. Cl.
CPC ..... *H01M 10/6563* (2015.04); *H01M 2/1077* (2013.01); *H01M 10/0525* (2013.01); *H01M 10/613* (2015.04); *H01M 10/625* (2015.04); *H01M 10/6554* (2015.04); *H01M 10/6556* (2015.04); *H01M 10/6566* (2015.04); *H01M 2220/20* (2013.01)

(58) Field of Classification Search
None
See application file for complete search history.

(56) References Cited

U.S. PATENT DOCUMENTS

| | | |
|---|---|---|
| 5,215,834 A | 6/1993 | Reher et al. |
| 5,385,793 A | 1/1995 | Tiedemann et al. |

(Continued)

FOREIGN PATENT DOCUMENTS

| | | |
|---|---|---|
| AU | 2010273997 A1 | 2/2012 |
| EP | 2325920 A2 | 5/2011 |

(Continued)

OTHER PUBLICATIONS

PCT/US2015/035788 International Search Report and Written Opinion dated Sep. 23, 2015.

*Primary Examiner* — Haroon S. Sheikh
(74) *Attorney, Agent, or Firm* — Boardman & Clark LLP

(57) ABSTRACT

The present disclosure includes a system having a battery module, where the battery module includes a housing having a top side, a lateral side, and an edge extending along and between the top side and the lateral side. The battery module also includes electrochemical cells disposed in the housing, and a heat sink disposed on the lateral side of the housing. A fan is disposed over the top side of the housing. A hood includes a first hood portion disposed over the top side of the housing and the fan and a second hood portion coupled to the first hood portion and disposed over the lateral side of the housing, where the hood defines an airspace between the hood and the housing and the hood is configured to guide an airflow through the airspace from the fan on the top side of the housing, over the edge between the top side and the lateral side of the housing, and over the heat sink disposed on the lateral side of the housing.

23 Claims, 9 Drawing Sheets

(51) Int. Cl.
*H01M 10/6566* (2014.01)
*H01M 10/6554* (2014.01)
*H01M 2/10* (2006.01)

(56) References Cited

U.S. PATENT DOCUMENTS

| | | |
|---|---|---|
| 5,449,571 A | 9/1995 | Longardner et al. |
| 5,585,204 A | 12/1996 | Oshida et al. |
| 5,721,064 A | 2/1998 | Pedicini et al. |
| 6,448,741 B1 * | 9/2002 | Inui .................... H01M 2/0225 320/107 |
| 6,459,580 B1 | 10/2002 | Della Fiora et al. |
| 6,468,150 B1 | 10/2002 | Langdon et al. |
| 6,566,005 B1 | 5/2003 | Shimma et al. |
| 6,628,521 B2 | 9/2003 | Gustine et al. |
| 6,781,830 B2 | 8/2004 | Barth et al. |
| 6,798,663 B1 | 9/2004 | Rubenstein |
| 6,808,834 B2 | 10/2004 | Koschany |
| 6,866,544 B1 | 3/2005 | Casey et al. |
| 6,949,309 B2 | 9/2005 | Moores, Jr. et al. |
| 7,112,387 B2 | 9/2006 | Kimoto et al. |
| 7,172,831 B2 | 2/2007 | Jaura et al. |
| 7,189,473 B2 | 3/2007 | Smith et al. |
| 7,304,844 B2 | 12/2007 | Jan et al. |
| 7,326,490 B2 | 2/2008 | Moores, Jr. et al. |
| 7,357,135 B2 | 4/2008 | Cunningham |
| 7,371,965 B2 | 5/2008 | Ice |
| 7,388,745 B2 | 6/2008 | Deluga et al. |
| 7,405,932 B2 | 7/2008 | Vinson et al. |
| 7,414,841 B2 | 8/2008 | Chen et al. |
| 7,447,028 B2 | 11/2008 | Lai et al. |
| 7,558,061 B2 | 7/2009 | Franz et al. |
| 7,560,190 B2 | 7/2009 | Ahn et al. |
| 7,572,549 B2 | 8/2009 | Wegner |
| 7,618,740 B2 | 11/2009 | Hamada et al. |
| 7,642,003 B2 | 1/2010 | Ahn et al. |
| 7,654,351 B2 | 2/2010 | Koike et al. |
| 7,736,792 B2 | 6/2010 | Moores, Jr. et al. |
| 7,746,003 B2 | 6/2010 | Lee et al. |
| 7,746,034 B2 | 6/2010 | Lee et al. |
| 7,867,663 B2 | 1/2011 | Park et al. |
| 7,947,387 B2 | 5/2011 | Saito et al. |
| 7,968,223 B2 | 6/2011 | Lee et al. |
| 7,974,098 B2 | 7/2011 | Oki et al. |
| 7,984,943 B2 | 7/2011 | Iwano et al. |
| 7,987,939 B2 | 8/2011 | Kisiler et al. |
| 8,003,245 B2 | 8/2011 | Lee et al. |
| 8,035,973 B2 | 10/2011 | McColloch |
| 8,042,637 B2 | 10/2011 | Nagata et al. |
| 8,080,972 B2 | 12/2011 | Smith |
| 8,081,470 B2 | 12/2011 | Oki et al. |
| 8,084,156 B2 | 12/2011 | Okuda et al. |
| 8,085,538 B2 | 12/2011 | Noshadi et al. |
| 8,096,136 B2 | 1/2012 | Zheng |
| 8,197,958 B2 | 6/2012 | Gaben et al. |
| 8,394,521 B2 | 3/2013 | Umemoto et al. |
| 8,399,118 B2 | 3/2013 | Gadawski et al. |
| 8,440,339 B2 | 5/2013 | Harada et al. |
| 8,459,343 B2 | 6/2013 | Hung et al. |
| 8,475,953 B2 | 7/2013 | Chew et al. |
| 8,492,019 B2 | 7/2013 | Klaus et al. |
| 8,507,122 B2 | 8/2013 | Saito et al. |
| 8,518,568 B2 | 8/2013 | Dougherty et al. |
| 8,530,069 B2 | 9/2013 | Wood et al. |
| 8,609,268 B2 | 12/2013 | Fuhr et al. |
| 8,617,735 B2 | 12/2013 | Lee et al. |
| 8,642,204 B2 | 2/2014 | Higashino et al. |
| 8,647,762 B2 | 2/2014 | Schwab et al. |
| 8,652,678 B2 | 2/2014 | Musetti |
| 8,663,829 B2 | 3/2014 | Koetting et al. |
| 8,685,556 B2 | 4/2014 | Minokawa |
| 8,685,558 B2 | 4/2014 | Fuhrmann et al. |
| 8,722,229 B2 | 5/2014 | Haussmann |
| 8,734,975 B2 | 5/2014 | Burrows et al. |
| 8,739,856 B2 | 6/2014 | Fedorov |
| 8,758,924 B2 | 6/2014 | Tennessen et al. |
| 8,785,024 B2 | 7/2014 | Han et al. |
| 8,785,025 B2 | 7/2014 | Sohn |
| 8,785,026 B2 | 7/2014 | Hu et al. |
| 8,785,027 B2 | 7/2014 | Soong et al. |
| 2003/0096160 A1 * | 5/2003 | Sugiura ............... H01M 2/1022 429/120 |
| 2005/0008912 A1 | 1/2005 | Yang et al. |
| 2005/0269995 A1 | 12/2005 | Donnelly et al. |
| 2006/0093901 A1 | 5/2006 | Lee et al. |
| 2006/0216579 A1 | 9/2006 | Cho |
| 2007/0248876 A1 | 10/2007 | Ahn et al. |
| 2008/0280192 A1 | 11/2008 | Drozdz et al. |
| 2008/0299448 A1 | 12/2008 | Buck et al. |
| 2009/0135558 A1 | 5/2009 | Hughes |
| 2009/0155675 A1 | 6/2009 | Houchin-Miller |
| 2009/0155680 A1 | 6/2009 | Maguire et al. |
| 2009/0253029 A1 | 10/2009 | Inoue |
| 2010/0104927 A1 | 4/2010 | Albright |
| 2011/0039142 A1 | 2/2011 | Kwag et al. |
| 2011/0091759 A1 | 4/2011 | Song |
| 2011/0104543 A1 | 5/2011 | Kim et al. |
| 2011/0111273 A1 | 5/2011 | Okada et al. |
| 2011/0135993 A1 | 6/2011 | An et al. |
| 2011/0189522 A1 | 8/2011 | Kim |
| 2011/0189525 A1 | 8/2011 | Palanchon et al. |
| 2011/0229749 A1 | 9/2011 | Kim et al. |
| 2011/0244291 A1 | 10/2011 | Sun |
| 2011/0256431 A1 | 10/2011 | TenHouten et al. |
| 2011/0311848 A1 | 12/2011 | Garascia et al. |
| 2012/0028099 A1 * | 2/2012 | Aoki ................... H01M 2/1077 429/120 |
| 2012/0148881 A1 | 6/2012 | Quisenberry |
| 2012/0237805 A1 | 9/2012 | Abels et al. |
| 2012/0282510 A1 * | 11/2012 | Youngs ................... B60K 6/28 429/120 |
| 2013/0071706 A1 | 3/2013 | Lee |
| 2013/0136955 A1 | 5/2013 | Chuang et al. |
| 2013/0183571 A1 | 7/2013 | Miyazaki et al. |
| 2013/0260194 A1 | 10/2013 | Meyer et al. |
| 2014/0038010 A1 | 2/2014 | Ronning et al. |
| 2014/0079974 A1 | 3/2014 | Schmidt et al. |
| 2014/0113167 A1 | 4/2014 | Itoi et al. |
| 2014/0154541 A1 | 6/2014 | Asakura et al. |
| 2014/0186661 A1 | 7/2014 | Payne |
| 2015/0357692 A1 | 12/2015 | Piggott et al. |

FOREIGN PATENT DOCUMENTS

| | | |
|---|---|---|
| EP | 2372760 A2 | 10/2011 |
| JP | 2012094313 | 5/2012 |
| JP | 2013016301 | 1/2013 |
| JP | 2014031111 | 2/2014 |
| WO | 2010099355 A2 | 9/2010 |
| WO | 2011060074 A2 | 5/2011 |
| WO | 2011077109 A1 | 6/2011 |
| WO | 2013186020 A1 | 12/2013 |

* cited by examiner

BATTERY MODULE ACTIVE THERMAL MANAGEMENT FEATURES AND POSITIONING

BACKGROUND

The present disclosure relates generally to the field of batteries and battery modules. More specifically, the present disclosure relates to active (e.g., convective) thermal management features for Lithium-ion (Li-ion) battery modules.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 Volt (V) or 130V systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and operates at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

As technology continues to evolve, there is a need to provide improved power sources, particularly battery modules, for such vehicles. For example, it is now recognized that it is desirable to provide improved systems and methods for reducing a battery module's susceptibility to heating or overheating, which may negatively affect functionality and components of the battery module and electrochemical cells thereof.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to a system having a battery module, where the battery module includes a housing having a top side, a lateral side, and an edge extending along and between the top side and the lateral side. The battery module also includes electrochemical cells disposed in the housing, and a heat sink disposed on the lateral side of the housing. A fan is disposed over the top side of the housing. A hood includes a first hood portion disposed over the top side of the housing and the fan and a second hood portion coupled to the first hood portion and disposed over the lateral side of the housing, where the hood defines an airspace between the hood and the housing and the hood is configured to guide an airflow through the airspace from the fan on the top side of the housing, over the edge between the top side and the lateral side of the housing, and over the heat sink disposed on the lateral side of the housing.

The present disclosure also relates to a battery module. The battery module includes a housing having a top side, a lateral side, and an edge extending along and between the top side and the lateral side. The battery module also includes electrochemical cells disposed in the housing such that base ends of the electrochemical cells are proximate to the lateral side of the housing, where the base ends are opposite to terminal ends of the electrochemical cells and the terminal ends include terminals extending therefrom. The battery module includes a heat sink disposed on the lateral side of the housing proximate to the base ends of the electrochemical cells, and a fan disposed over the top side of the housing. Further, the battery module includes a hood having a first hood portion disposed over the top side of the housing and the fan and a second hood portion coupled to the first hood portion and disposed over the lateral side of the housing. The hood defines an airspace between the hood and the housing and the hood is configured to guide an airflow through the airspace from the fan on the top side of the housing, over the edge between the top side and the lateral side of the housing, and to the lateral side of the housing.

The present disclosure further relates a battery module having a housing that includes a top side and a lateral side coupled to the top side at an edge. Electrochemical cells are disposed in the housing and a heat sink is disposed on the lateral side of the housing. A fan is disposed on the top side of the housing. A hood includes a first hood portion disposed over the top side of the housing and the fan and a second hood portion coupled to the first hood portion and disposed over the lateral side of the housing. The hood defines an airspace between the hood and the housing and the hood is configured to guide an airflow through the airspace from the fan on the top side of the housing, over the edge between the top side and the lateral side of the housing, and to the lateral side of the housing. The hood includes outer ridges that contact the housing to contain the airflow within the airspace.

DRAWINGS

Various aspects of this disclosure may be better understood upon reading the following detailed description and upon reference to the drawings in which.

Figure 10:
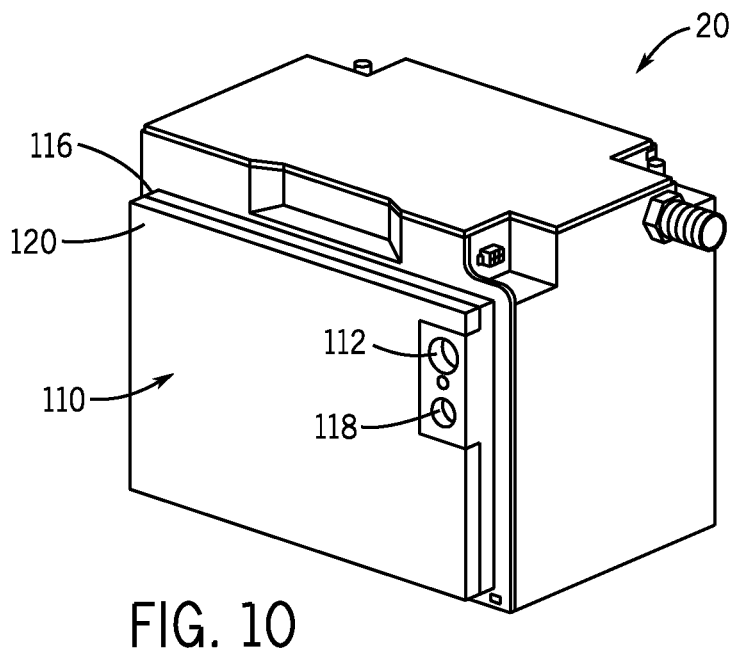
FIG. 10 is a back perspective view of an embodiment of a battery module for use in the vehicle of FIG. 1, in accordance with an aspect of the present disclosure.
Figure 11:
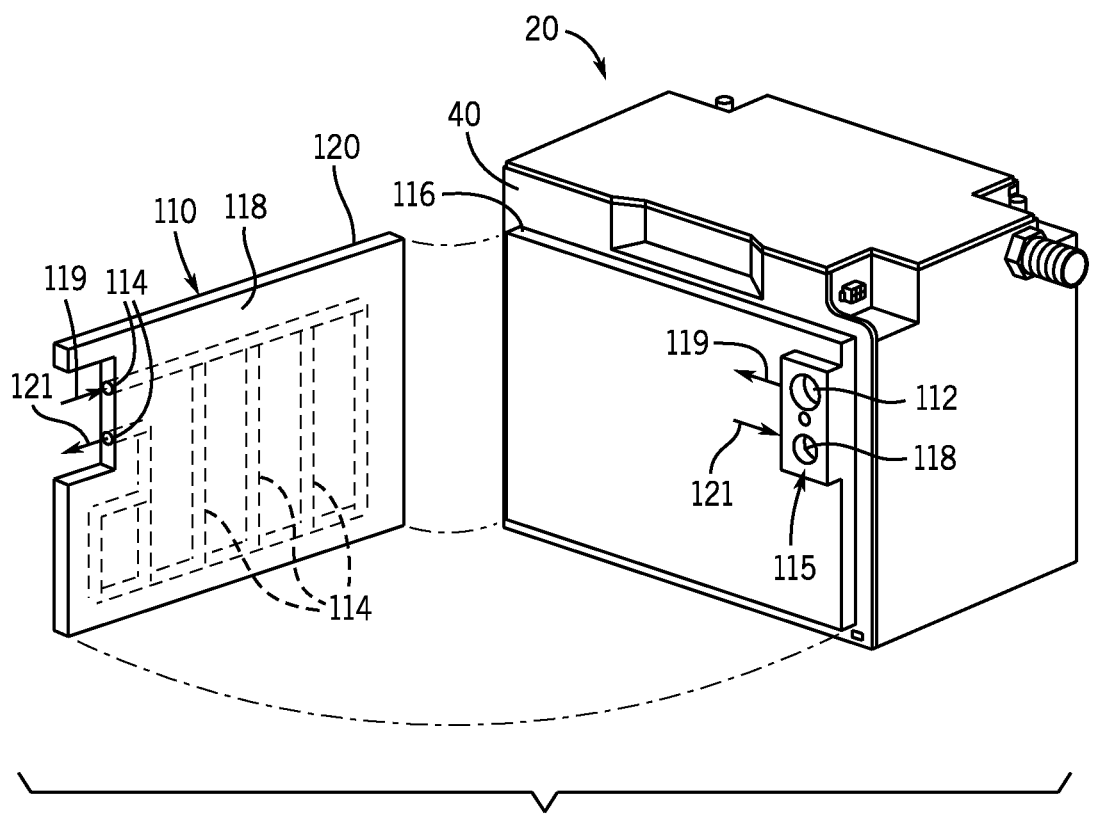
Figure 12:
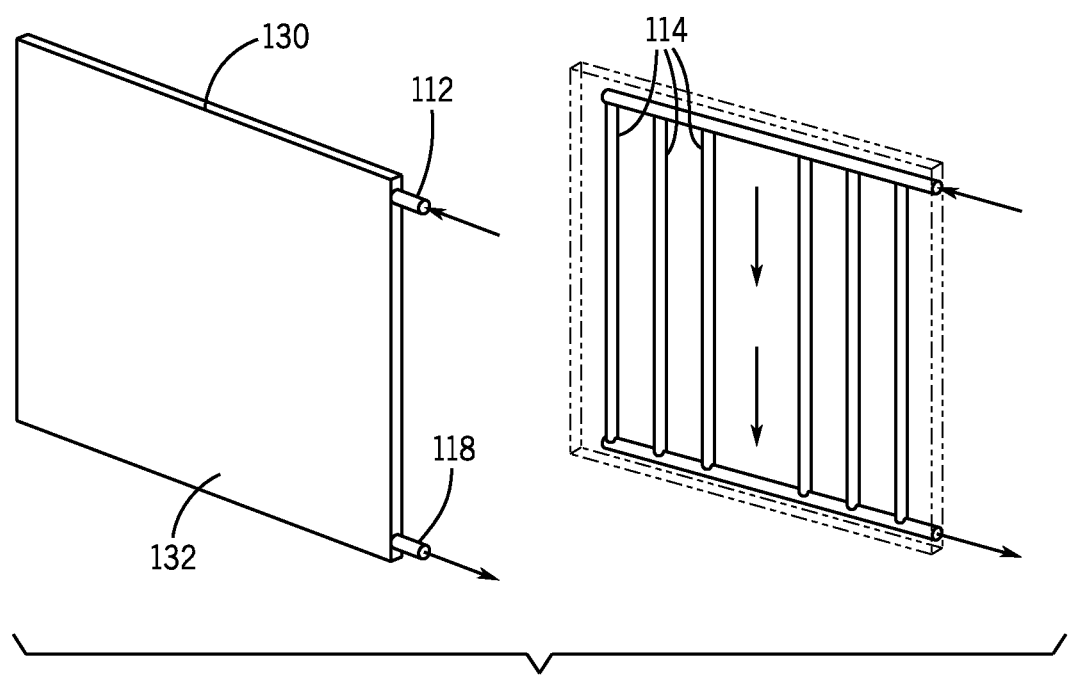

FIG. 11 a partially exploded back perspective view of an embodiment of the battery module of FIG. 10, in accordance with an aspect of the present disclosure; and FIG. 12 is a perspective view of an embodiment of an evaporator plate for use in a battery module, in accordance with an aspect of the present disclosure.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The battery systems described herein may be used to provide power to various types of electric vehicles (xEVs) and other high voltage energy storage/expending applications (e.g., electrical grid power storage systems). Such battery systems may include one or more battery modules, each battery module having a housing and a number of battery cells (e.g., Lithium-ion (Li-ion) electrochemical cells) arranged within the housing to provide particular voltages and/or currents useful to power, for example, one or more components of an xEV. As another example, battery modules in accordance with present embodiments may be incorporated with or provide power to stationary power systems (e.g., non-automotive systems).

Aspects of battery modules in accordance with the present disclosure may increase in temperature during operation. For example, as an electrochemical cell of a battery module generates and/or provides power to the vehicle, the electrochemical cell (and surrounding features of the battery module) may become hot (e.g., relative to the temperature of the same features when the battery module is not operating). It is now recognized that certain features can limit such temperature increases in an efficient manner.

Indeed, battery modules in accordance with the present disclosure include thermal management features (e.g., active or convective thermal management features) configured to cool the battery module. It should be noted that active thermal management features, in accordance with the present embodiment, generally include features (e.g., fans, blowers, evaporator plates) which generate or enable a fluid flow (e.g., coolant or airflow) proximate the battery module. Further, passive elements (e.g., cooling plates, cooling fins, thermal pads, thermal fillers, thermal adhesives, and gap pads) may be included and may cooperate with active thermal management features to extract heat away from the electrochemical cells and to divert the extracted heat to fluid flow generated or utilized by the active thermal management features (e.g., fans, blowers, evaporator plates).

In accordance with present embodiments, the battery module may include electrochemical cells disposed within a housing of the battery module, where the housing is configured to fit within a pre-defined or allotted space in the vehicle. For example, in vehicular applications, the pre-defined or allotted space may be a particular area (e.g., particular cross-sectional area) within the vehicle to retain the battery module. Certain aspects of the battery module may be designed to facilitate positioning of the battery module within the allotted space. For example, thermal management features may be disposed in particular locations of the battery module to reduce a footprint (e.g., a largest cross-sectional area) of the battery module, such that the footprint does not exceed the allotted space within the vehicle. In accordance with the present disclosure, the electrochemical cells may be disposed into the battery module such that broad faces (e.g., broad faces extending between base ends of the electrochemical cells and terminal ends of the electrochemical cells opposite the base ends, where the terminal ends of the electrochemical cells include terminals extending therefrom) are positioned substantially parallel with the battery module's footprint (e.g., allotted cross-sectional area) in the vehicle once the battery module is disposed into the vehicle. The electrochemical cells may be stacked upwardly, broad face to broad face, such that the stacks extend upwardly from the allotted space (e.g., once the battery module is positioned in the vehicle). In general, cooling of the battery module may be enhanced by generating a heat transfer path (e.g., via conductive members of the battery module) through the base ends of the electrochemical cells, which are disposed proximate to a side (e.g., a back side) of the housing within the housing. One or more heat sinks may be disposed (e.g., in-molded) into the side of the housing proximate the base ends of the electrochemical cells, where outer surfaces of the heat sinks are exposed to surrounding environment of the battery module.

To reduce the footprint of the battery module, a fan (e.g., configured to blow air over the heat sinks) may be disposed on a top of the housing of the battery module, as opposed to proximate to a later side (e.g., the back side) of the housing having the heat sinks. For example, disposing the fan on the back side of the housing would increase the largest cross-sectional area of the battery module with respect to the space allotted for the battery module in the vehicle. A flow diverting hood (e.g., a hood having two integrally formed portions that extend orthogonal to one another) may be disposed over the fan and over the heat sink on the back side of the housing, where one of the two integrally formed portions is positioned over the fan (and, thus, over the top of the housing) and the other of the two integrally formed portions is positioned over the heat sinks (and, thus, over the back side of the housing). Accordingly, a flow path is defined under the hood from the fan on the top side of the housing, over an edge of the housing (e.g., the edge between the top side and the back side of the housing), and over the back side of the housing (e.g., between the back side and the hood). Accordingly, in operation, the fan blows air that is diverted by the hood through the flow path (e.g., from the top of the housing to the back side of the housing having the heat sinks). The hood may include flow redistribution features (e.g., extensions) disposed within the flow path and configured to redistribute (e.g., disperse) the flow before or while the airflow passes over the heat sinks, thereby providing substantially thermally homogenous air across a width of the heat sinks (e.g., perpendicular to the flow path) as the airflow travels a length of the heat sinks.

In some embodiments, the battery module may include an evaporator plate in addition to, or as a replacement for certain of the above-described features. For example, instead of one or more heat sinks, the evaporator plate may be in-molded with the back side of the housing (or disposed adjacent to the back side of the housing), proximate to the base ends of the electrochemical cells. The evaporator plate may be configured to receive a coolant that flows through internal passages of the evaporator plate to cool the battery module (e.g., to extract heat from the electrochemical cells). The coolant may be routed into the evaporator plate from a refrigerant system of the vehicle or from another system within the vehicle, where the system extracts heat from the coolant after the coolant exits the evaporator plate and returns the coolant back to the evaporator plate for further cooling of the battery module. It should be noted that the evaporator plate and the above-described fan and hood, depending on the embodiment, may or may not be included in the same battery module.

Figure 1:
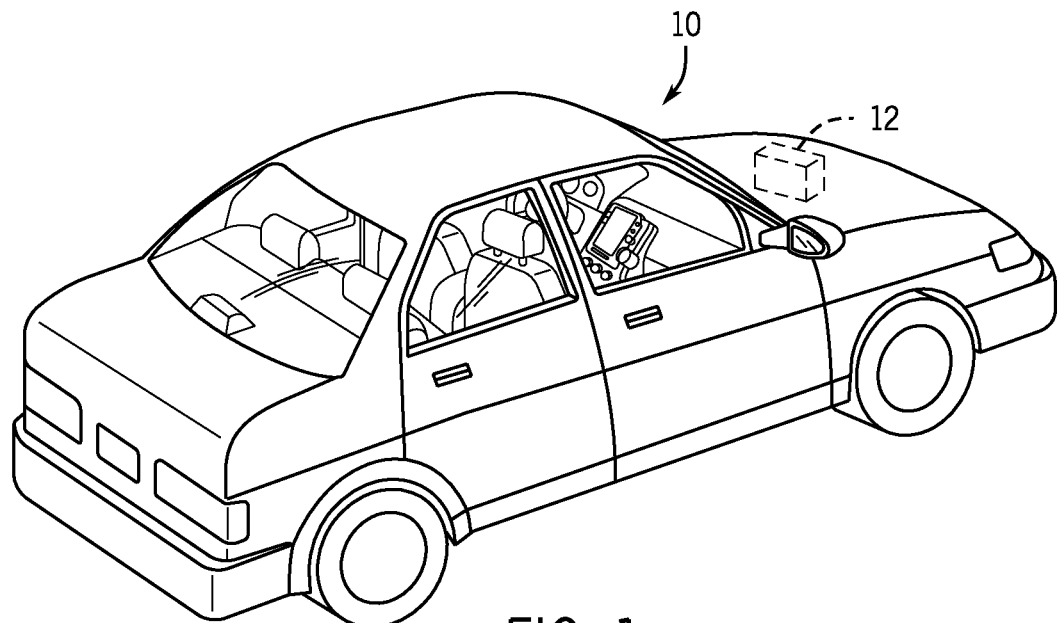
FIG. 1 is a perspective view of a vehicle having a battery system configured in accordance with present embodiments to provide power for various components of the vehicle.

To help illustrate, FIG. 1 is a perspective view of an embodiment of a vehicle 10, which may utilize a regenerative braking system. Although the following discussion is presented in relation to vehicles with regenerative braking systems, the techniques described herein are adaptable to other vehicles that capture/store electrical energy with a battery, which may include electric-powered and gas-powered vehicles.

As discussed above, it would be desirable for a battery system 12 to be largely compatible with traditional vehicle designs. Accordingly, the battery system 12 may be placed in a location in the vehicle 10 that would have housed a traditional battery system. For example, as illustrated, the vehicle 10 may include the battery system 12 positioned similarly to a lead-acid battery of a typical combustion-engine vehicle (e.g., under the hood of the vehicle 10). Furthermore, as will be described in more detail below, the battery system 12 may be positioned to facilitate managing temperature of the battery system 12. For example, in some embodiments, positioning a battery system 12 under the hood of the vehicle 10 may enable an air duct to channel airflow over the battery system 12 and cool the battery system 12.

Figure 2:
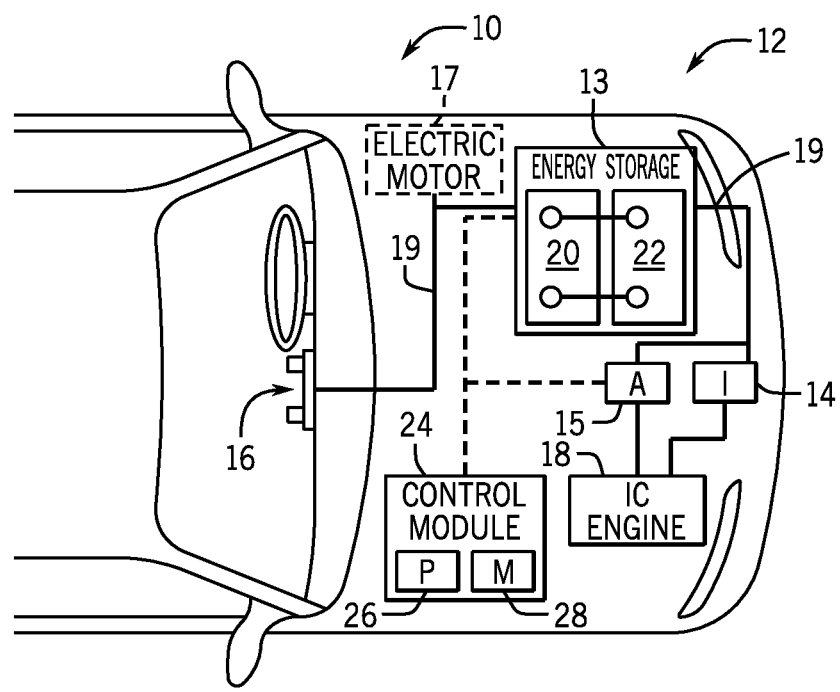
FIG. 2 is a cutaway schematic view of an embodiment of the vehicle and the battery system of FIG. 1.

A more detailed view of the battery system 12 is described in FIG. 2. As depicted, the battery system 12 includes an energy storage component 13 coupled to an ignition system 14, an alternator 15, a vehicle console 16, and optionally to an electric motor 17. Generally, the energy storage component 13 may capture/store electrical energy generated in the vehicle 10 and output electrical energy to power electrical devices in the vehicle 10.

In other words, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. Illustratively, in the depicted embodiment, the energy storage component 13 supplies power to the vehicle console 16 and the ignition system 14, which may be used to start (e.g., crank) the internal combustion engine 18.

Additionally, the energy storage component 13 may capture electrical energy generated by the alternator 15 and/or the electric motor 17. In some embodiments, the alternator 15 may generate electrical energy while the internal combustion engine 18 is running More specifically, the alternator 15 may convert the mechanical energy produced by the rotation of the internal combustion engine 18 into electrical energy. Additionally or alternatively, when the vehicle 10 includes an electric motor 17, the electric motor 17 may generate electrical energy by converting mechanical energy produced by the movement of the vehicle 10 (e.g., rotation of the wheels) into electrical energy. Thus, in some embodiments, the energy storage component 13 may capture electrical energy generated by the alternator 15 and/or the electric motor 17 during regenerative braking. As such, the alternator 15 and/or the electric motor 17 are generally referred to herein as a regenerative braking system.

To facilitate capturing and supplying electric energy, the energy storage component 13 may be electrically coupled to the vehicle's electric system via a bus 19. For example, the bus 19 may enable the energy storage component 13 to receive electrical energy generated by the alternator 15 and/or the electric motor 17. Additionally, the bus 19 may enable the energy storage component 13 to output electrical energy to the ignition system 14 and/or the vehicle console 16. Accordingly, when a 12 volt battery system 12 is used, the bus 19 may carry electrical power typically between 8-18 volts.

Additionally, as depicted, the energy storage component 13 may include multiple battery modules. For example, in the depicted embodiment, the energy storage component 13 includes a lithium ion (e.g., a first) battery module 20 and a lead-acid (e.g., a second) battery module 22, which each includes one or more battery cells. In other embodiments, the energy storage component 13 may include any number of battery modules. Additionally, although the lithium ion battery module 20 and lead-acid battery module 22 are depicted adjacent to one another, they may be positioned in different areas around the vehicle. For example, the lead-acid battery module 22 may be positioned in or about the interior of the vehicle 10 while the lithium ion battery module 20 may be positioned under the hood of the vehicle 10.

In some embodiments, the energy storage component 13 may include multiple battery modules to utilize multiple different battery chemistries. For example, when the lithium ion battery module 20 is used, performance of the battery system 12 may be improved since the lithium ion battery chemistry generally has a higher coulombic efficiency and/or a higher power charge acceptance rate (e.g., higher maximum charge current or charge voltage) than the lead-acid battery chemistry. As such, the capture, storage, and/or distribution efficiency of the battery system 12 may be improved.

To facilitate controlling the capturing and storing of electrical energy, the battery system 12 may additionally include a control module 24. More specifically, the control module 24 may control operations of components in the battery system 12, such as relays (e.g., switches) within energy storage component 13, the alternator 15, and/or the electric motor 17. For example, the control module 24 may regulate amount of electrical energy captured/supplied by each battery module 20 or 22 (e.g., to de-rate and re-rate the battery system 12), perform load balancing between the battery modules 20 and 22, determine a state of charge of each battery module 20 or 22, determine temperature of each battery module 20 or 22, control voltage output by the alternator 15 and/or the electric motor 17, and the like.

Accordingly, the control unit 24 may include one or more processor 26 and one or more memory 28. More specifically, the one or more processor 26 may include one or more application specific integrated circuits (ASICs), one or more field programmable gate arrays (FPGAs), one or more general purpose processors, or any combination thereof. Additionally, the one or more memory 28 may include volatile memory, such as random access memory (RAM), and/or non-volatile memory, such as read-only memory (ROM), optical drives, hard disc drives, or solid-state drives. In some embodiments, the control unit 24 may include portions of a vehicle control unit (VCU) and/or a separate battery control module.

Figure 3:
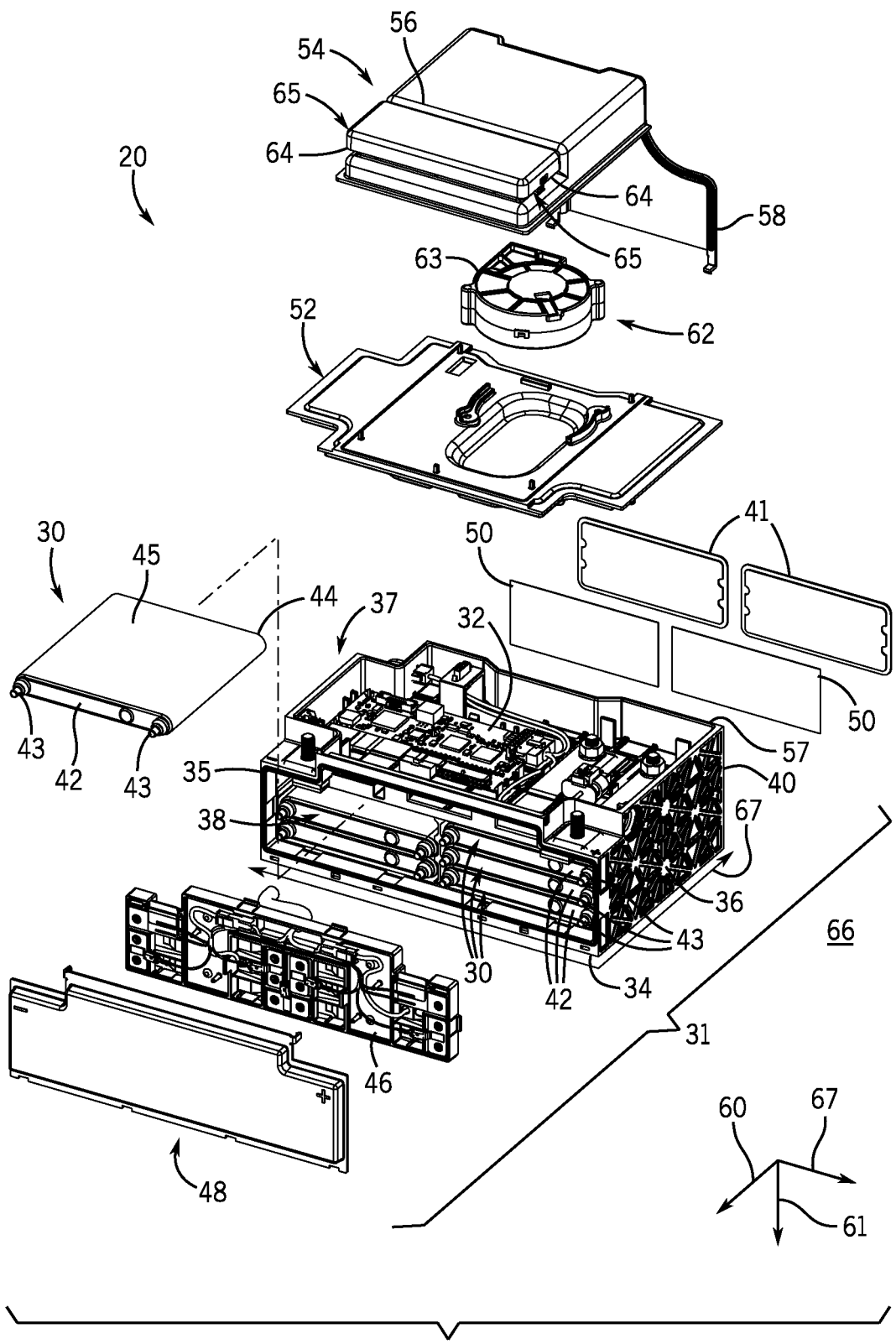
FIG. 3 is an exploded perspective view of an embodiment of a battery module for use in the vehicle of FIG. 1, in accordance with an aspect of the present disclosure.

An exploded perspective view of one embodiment of the lithium-ion (Li-ion) battery module 20, in accordance with the present disclosure, is shown in FIG. 3. In the illustrated embodiment, the battery module 20 includes a number of individual electrochemical cells 30 (e.g., Li-ion electrochemical cells) housed in a housing 31 of the battery module 20. The housing 31 includes a top side 32 (e.g., top wall), a bottom side 34 (e.g., bottom wall), and two reinforcing sides 35, 36 (e.g., reinforcing walls), which together form a base structure 37 of the housing 31. It should be noted that reference to the top side 32, the bottom side 34, and the two reinforcing sides 35, 36 in the illustrated embodiment may refer to an orientation of the battery module 20 (and, thus, the housing 31 thereof) within the vehicle 10. Other embodiments may include similar relative arrangements with respect to the components (e.g., the sides) of the housing 31, but may include a different positioning within the vehicle 10. The base structure 37 in the illustrated embodiment is open on a front side 38 and includes a partially open back side 40 that is closed by thermally conductive (e.g., metal) heat sinks 41 disposed on (e.g., in-molded with) the back side 40 of the base structure 37. For example, the partially open back side 40 may be coupled to (e.g., integrally formed with) the top side 32, the bottom side 34, and the two reinforcing sides 35, 36 via edges extending along and between the respective sides, and open central portions of the partially open back side 40 may be closed via the heat sinks 41. The electrochemical cells 30 are disposed into the base structure 37 such that terminal ends 42 of the electrochemical cells 30 (e.g., having terminals 43) are proximate to the front side 38 of the base structure 37, and base ends 44 opposite to the terminal ends 42 are proximate to the back side 40 of the base structure 37. Further, the electrochemical cells are stacked (e.g., in two stacks or columns), with broad faces 45 of the electrochemical cells 30 (e.g., broad faces 45 extending between the base ends 44 and the terminal ends 42) stacked one against the other. This positioning may enable the heat sinks 41 to extract heat from the base ends 44. In some embodiments, heat transfer may be more efficient through the base ends 44 of the electrochemical cells 30 than through other portions of the electrochemical cells 30.

In the illustrated embodiment, the open front side 38 may be at least partially closed by an e-carrier 46 of the housing 31, which is configured to establish electrical connections between the electrochemical cells 30 and may also be configured to serve as a cover for the open front side 38 of the base structure 37. An additional cover 48 may fit over the e-carrier 46 to fully enclose (e.g., seal) the housing 31 by fully covering the open front side 38 of the base structure 37. As previously described, the heat sinks 41 may be in-molded with (or otherwise disposed on) the back side 40 of the base structure 37 to enclose the back side 40. Thermal layers 50 (e.g., thermal pads, thermal gap pads, thermal adhesives, thermal fillers, thermal pastes) may be disposed between the heat sinks 41 and base ends 44 of the electrochemical cells 30 to enhance a heat transfer path from the base ends 44 to the heat sinks 41. For example, the thermal layers 50 may adhesively couple to the base ends 44 of the electrochemical cells 30 and to the heat sinks 41. The thermal layers 50 may be thermally conductive to enhance heat transfer from the base ends 44 to the heat sinks 41, may be compressive to reduce air gaps in the heat transfer path (e.g., between the base ends 44 of the electrochemical cells 30 and the heat sinks 41), and may be electrically insulative to electrically isolate the electrochemical cells 30 from the heat sinks 41.

Further, a top cover 52 may fit over the top side 32 of the base structure 37 of the housing 31. Certain components (e.g., control circuitry) of the battery module 20 may be disposed on top of the top side 32, between the top side 32 of the base structure 37 and the top cover 52 of the housing 31. Further still, a hood 54 may be disposed over the top cover 52 of the housing 31. The hood 54 may include two portions 56, 58, where the first portion 56 and the second portion 58 are substantially orthogonal to one another such that the hood 54 has a substantially L-shaped cross-section. For example, in the illustrated embodiment, the first portion 56 extends over the top cover 52 of the housing 31 in direction 60. The second portion 58 extends from the first portion 56 downwardly in direction 61, over the back side 40 of the base structure 37 (and, thus, over the heat sinks 41 disposed (e.g., in-molded) in the back side 40 of the base structure 37 to enclose the back side 40), such that the hood 54 covers an edge 57 between the top side 34 and the back side 40 of the base structure 37. It should be noted that the first and second portions 56, 58 may be integrally formed (e.g., as a single molded piece) or may be two separate components that are coupled together as an assembly. A single airspace may be defined between the first portion 56 of the hood 54 and the top cover 52 of the housing 31 (e.g., a first portion of the single airspace), and between the second portion 58 of the hood 54 and the back side 42 of the base structure 37 (e.g., a second portion of the single airspace). A fan 62 may be disposed under the hood 54 (e.g., under the first portion 56 of the hood 54), between the first portion 56 of the hood 54 and the top cover 52 of the housing 31 (e.g., the top cover 52 disposed onto the top side 32 of the base structure 37).

In accordance with present embodiments, the fan 62 is configured to blow air within the airspace underneath the hood 54. For example, the fan 62 includes an air intake 63 that draws air into the fan 62 through one or more openings 64 in the hood 54. In the illustrated embodiment, the openings 64 are disposed on one or more side surfaces 65 of the first portion 56 of the hood 54. In the orientation, disposing the opening(s) 64 on the side surface(s) 65 may reduce a likelihood that contaminants (e.g., dust or particles) fall into and under the hood 54 from above the hood 54 (e.g., due to gravity). The fan 62 draws air into the fan 62 via the air intake 63 and blows air within the airspace opposite to direction 60, such that an airflow generated by the fan 62 is routed toward the second portion 58 of the hood 54. The second portion 58 is generally configured to divert the airflow downwardly, in direction 61, over the back side 40 of the base structure 37. In other words, the hood 54 operates as a flow diverting hood. The airflow continues through the airspace between the second portion 58 of the hood 54 and the back side 40 of the base structure 37 (e.g., over the back side 40 having the heat sinks 41 in-molded in the back side 40), such that the air passes over the heat sinks 41. Accordingly, as previously described, the heat sinks 41 extract heat from the base ends 44 of the electrochemical cells 30, and the fan 62 blows air over the heat sinks 41 to extract heat from the heat sinks 41. The air exits the airspace after passing over the heat sinks 41 and vents to an area 66 outside of the battery module 20.

Disposing the fan 62 on the top cover 52 (e.g., above the top side 32 of the base structure 37) of the housing 31, as opposed to directly proximate to (or on) the back side 40 of the base structure 37, may substantially reduce a footprint 67 of the battery module 20. For example, the footprint 67 of the battery module 20 may define the largest cross-sectional area of the battery module 20 with respect to a plane defined by directions 60 and 67 in the illustrated embodiment. As previously described, a vehicle utilizing the battery module 20 may have a pre-defined (or allotted) space (e.g., surface area) on which the battery module 20 is to be positioned. The allotted surface area within the vehicle may be oriented substantially parallel with the footprint 67 of the battery module 20 such that the battery module 20 covers the allotted surface area from overhead. For example, the illustrated battery module 20 is disposed into the vehicle such that the illustrated footprint 67 aligns and corresponds with the allotted space in the vehicle. By disposing the fan 62 on the top cover 52 of the housing 31, and diverting the airflow to the back side 40 of the housing 31, the airflow extracts heat from the heat sinks 41 and the fan 62 does not contribute to the footprint 67. Disposing the fan 62 on other areas of the battery module 20 (e.g., on the back side 40 of the base structure 37) would substantially increase the footprint 67 of the battery module 20.

Figure 4:
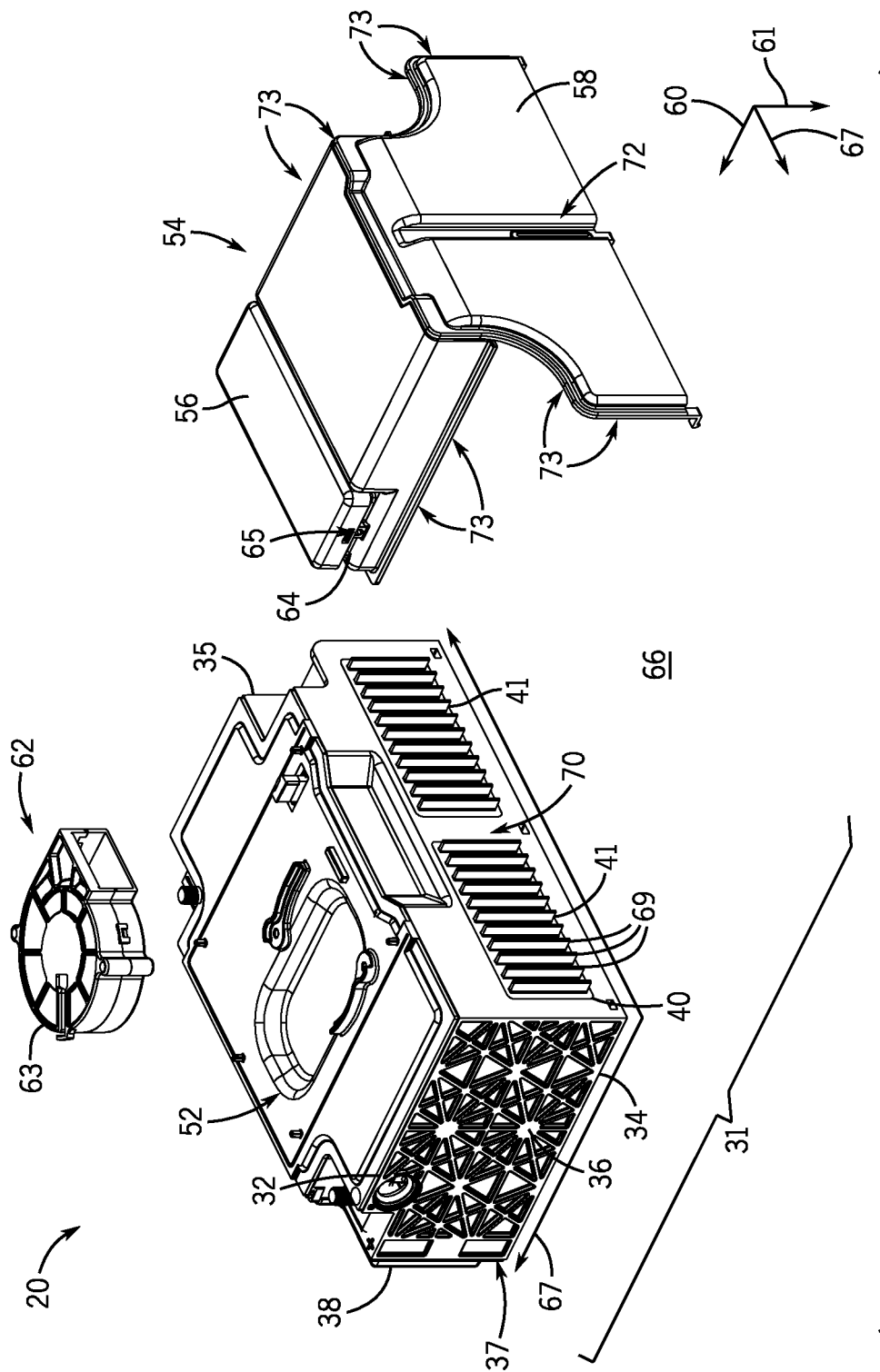
FIG. 4 is a partially exploded back perspective view of an embodiment of the battery module of FIG. 3, in accordance with an aspect of the present disclosure.

A partially exploded back perspective view of an embodiment of the battery module 20 in FIG. 3 is shown in FIG. 4. In the illustrated embodiment, as previously described, the heat sinks 41 are disposed in (e.g., in-molded with) the back side 40 of the base structure 37 of the housing 31. The illustrated heat sinks 41 are thermally conductive (e.g., metal) plates with cooling fins 69 extending therefrom, although, in another embodiment, the heat sinks 41 may be thermally conductive (e.g., metal) plates without the cooling fins 69. A central portion 70 of the back side 40 of the base structure 37 separates the heat sinks 41 from each other. For example, the two heat sinks 41 may be substantially aligned with two stacks of electrochemical cells within the base structure 37. An internal partition may separate the two stacks of electrochemical cells, where the central portion 70 of the back side 40 of the base structure 37 is aligned with the internal partition. Such a configuration may enable cost savings. For example, the heat sinks 41 may include a thermally conductive (e.g., metal) material, which may be expensive. Because the base ends 44 of the electrochemical cells are not disposed proximate to the central portion 70 (they are only disposed proximate to the heat sinks 41 in the illustrated embodiment), the central portion 70 may not receive as much heat as the heat sinks 41. Accordingly, a heat sink portion proximate to the central portion 70 may not extract as much heat as the illustrated heat sinks 41.

Figure 5:
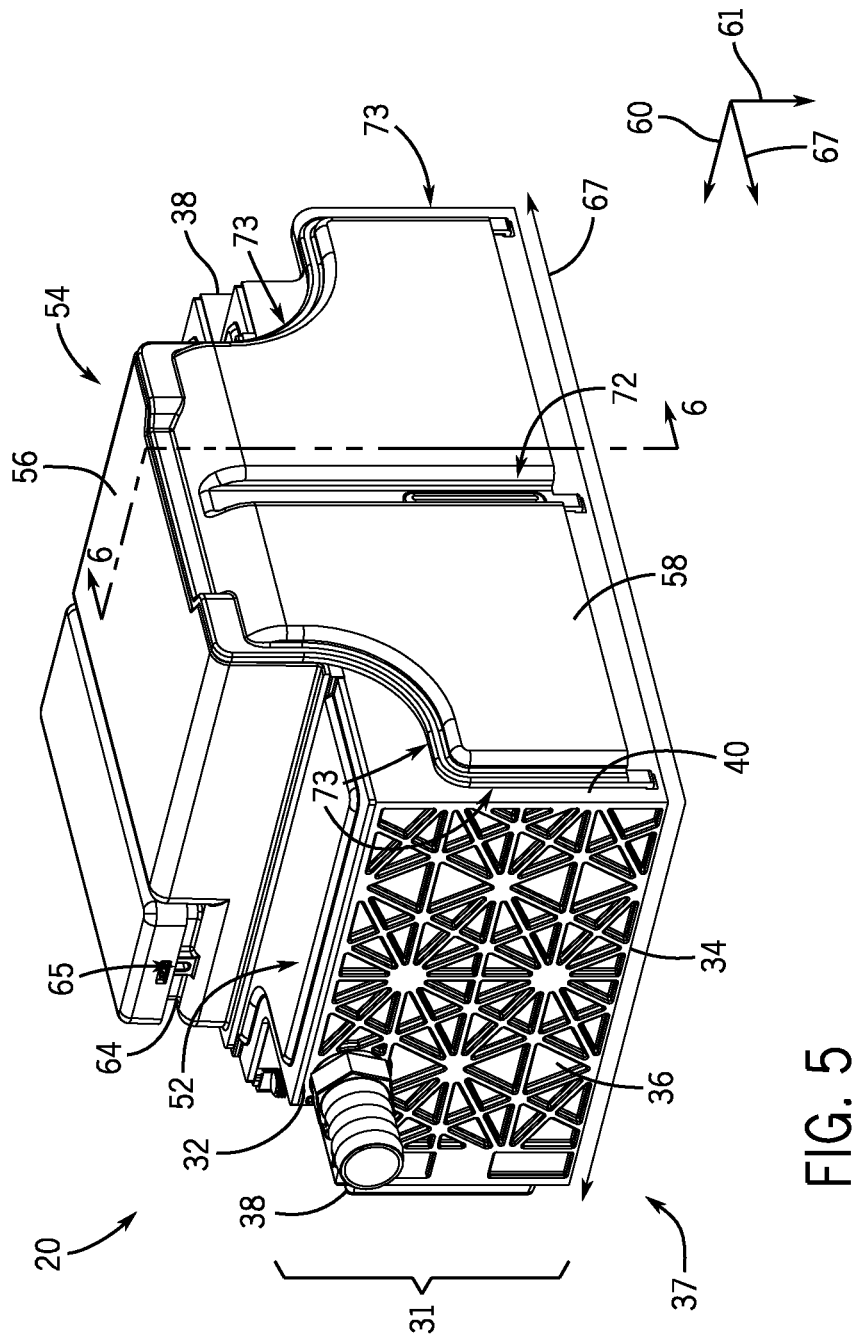
FIG. 5 is a back perspective view of an embodiment of the battery module of FIG. 3, in accordance with an aspect of the present disclosure.

It should be noted that the hood 54 may include features to block airflow proximate to the central portion 70, such that the airflow (e.g., from the fan 62) is diverted primarily over the heat sinks 41 and generally avoids less efficient heat transfer with the central portion 70. For example, the second portion 58 of the hood 54 (e.g., the second portion 58 extending over the back side 40) includes a central ridge 72 configured to be disposed proximate to the central portion 70 of the back side 40 of the base structure 37. In some embodiments, the central ridge 72 may contact, and seal against, the central portion 70. The central ridge 72 is configured to divert the airflow (e.g., generated by the fan 62) away from the central portion 70, thereby diverting the airflow proximate to the heat sinks 41 only. This may enable improved heat transfer from the heat sinks 41 to the air, as more air contacts the heat sinks 41. It should also be noted that the hood 54 may include outer ridges 73 configured to seal against various portions of the battery module 20 or housing 31 thereof. The outer ridges 73 are configured to retain the airflow within the flow path or airspace (e.g., retain the airflow under the hood 54). An assembled embodiment of the battery module 20 having the central ridge 72 sealed against the central portion 70 of the back side of the base structure 37 and the outer ridges 73 is shown in FIG. 5.

Figure 6:
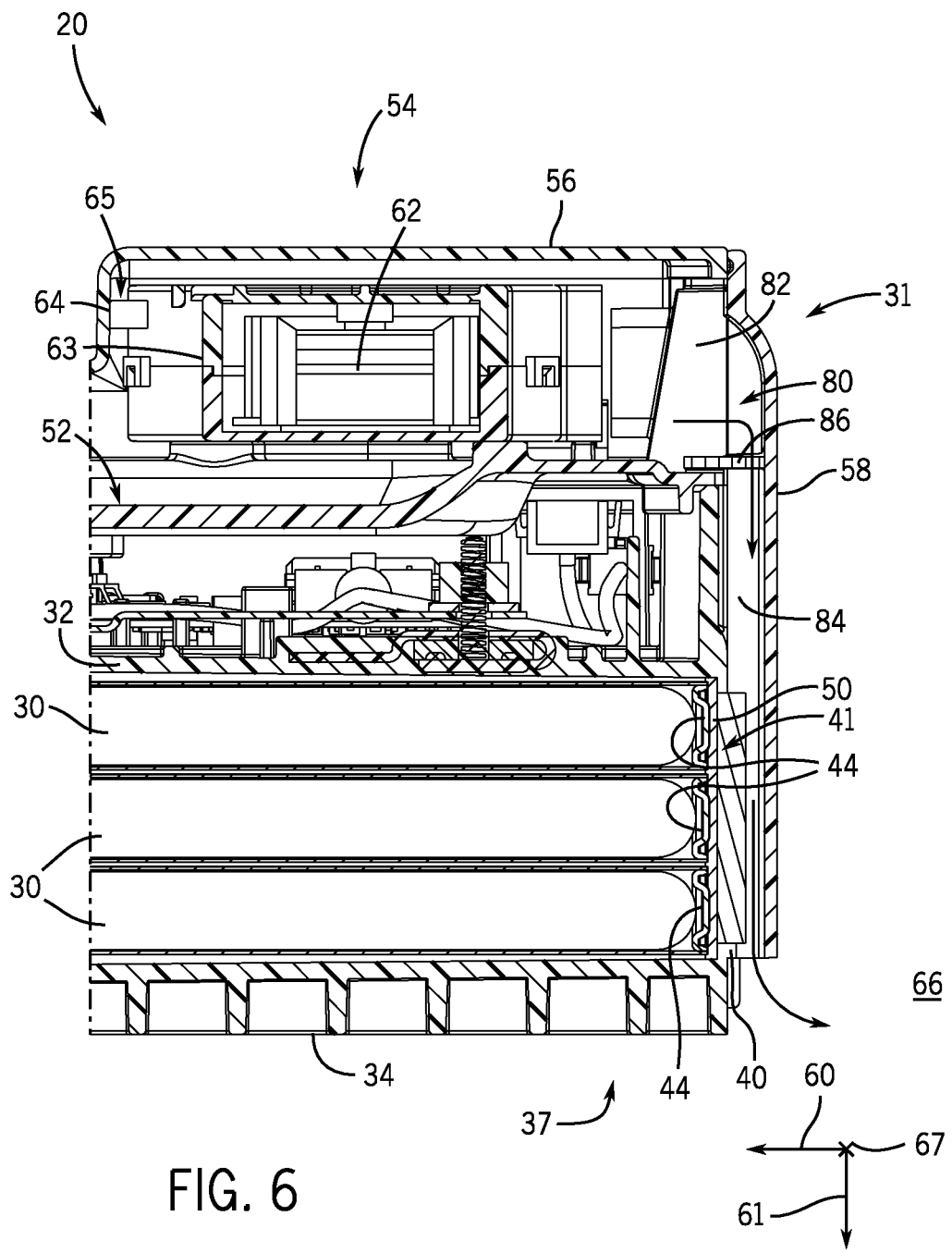
FIG. 6 is a cross-sectional side view of a portion of an embodiment of the battery module of FIG. 5 taken along line 6-6, in accordance with an aspect of the present disclosure.

A cross-sectional side view of a portion of an embodiment of the battery module 20 is shown in FIG. 6. In the illustrated embodiment, the conductive heat transfer path (from the electrochemical cells 30) is defined from the base ends 44 of the electrochemical cells 30, through the thermal interfaces 50, and to the heat sinks 41. As previously described, the fan 62 is disposed on the top cover 52 of the housing 31, where the top cover 52 is disposed over the top side 32 of the base structure 37. The fan 62 is generally disposed between the first portion 56 of the hood 54 and the top cover 52 of the housing 31. The fan 62 is configured to blow air opposite to direction 60 toward the second portion 58 of the hood 54. The second portion 58 diverts the airflow downwardly, in direction 61, over the heat sinks 41. For example the fan 62 blows the air into an airspace 80 under the hood 54. The airspace 80 includes a first airspace portion 82 between the top cover 52 of the housing 31 and the first portion 56 of the hood 54, and a second airspace portion 84 between the back side 40 of the base structure 37 and the second portion 58 of the hood 54. The first airspace portion 82 and the second airspace portion 84 are fluid coupled, such that the air provided by the fan 62 (or blower) is routed through the first and second airspace portions 82, 84.

In the illustrated embodiment, a sponge filter 86 (or multiple sponge filters) is disposed in the airspace 80 (e.g., in the first airspace portion 82), where the sponge filter 86 is configured to remove (e.g., filter) contaminants (e.g., dust) from the airflow directed by the fan 62 to the airspace 80. In some embodiments, the sponge filter 86 may be disposed in the second airspace portion 84, or in both the first and second airspace portions 82, 84. Further, as previously described, the fan 62 may draw air into the fan 62 via the air intake 63. In the illustrated embodiment, the air intake 63 of the fan 62 sucks air in through the opening 64 in one of the side surfaces 65 of the hood 54 (e.g., one of the side surfaces 65 of the first portion 56 of the hood 54). This may reduce a susceptibility of contaminants (e.g., dust) falling into the hood 54 from above the hood 54. It should be noted that the one or more openings 64 may be disposed on any side surface of the hood 54 in fluid communication with the air intake 63. Further, as previously described, disposing the fan 62 on the top cover 52 of the housing 31 reduces the footprint 67 (see FIG. 5) of the battery module 20 compared to embodiments with the fan 62 disposed in other areas of the battery module 20 (e.g., on the back side 40), while still providing active (e.g., convective) cooling.

Figure 7:
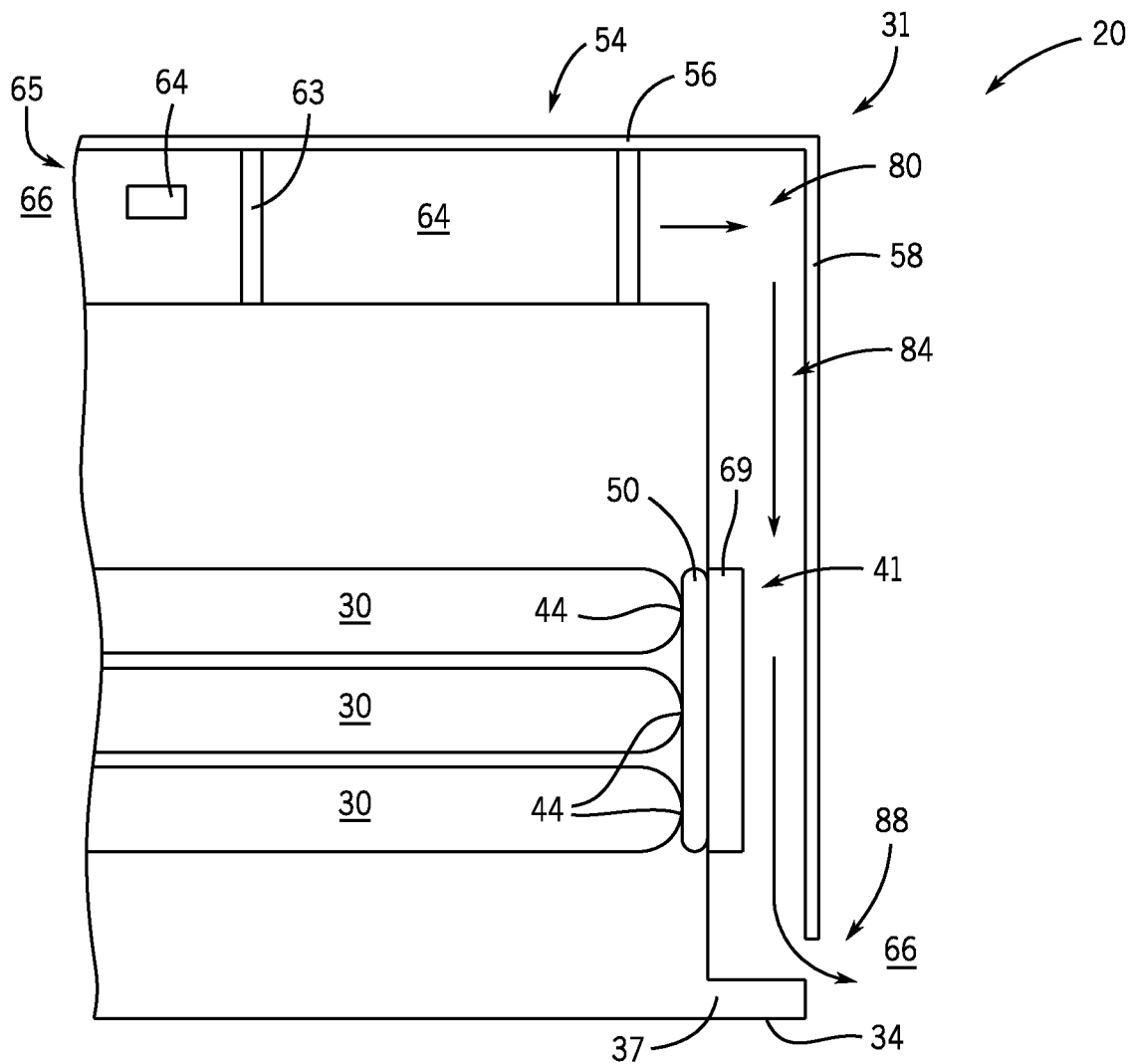
FIG. 7 is a cross-sectional schematic view of a portion of a battery module of having an airspace, in accordance with an aspect of the present disclosure.
Figure 7:
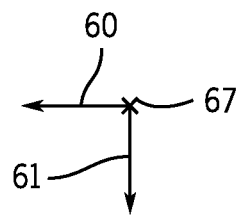

For clarity, a schematic cross-sectional view of the fan 62 and the airspace 80 is shown in FIG. 7 in accordance with present embodiments. As described above, the air intake 63 of the fan 62 draws air into and under the hood 54 from the surrounding environment 66 through one or more openings 64 on one of the side surfaces 65 on the hood 54. It should be noted that the one or more openings 64 may be disposed on any side surface 65 of the hood 54, such that contaminants are blocked from falling from above the hood 54 into and under the hood 54 (e.g., through a top surface of the hood 54 due to gravity). The fan 62 blows air drawn in by the air intake 63 into the first airspace portion 82 of the airspace 80 opposite to direction 60, and the hood 54 redirects the air downwardly in direction 61 into the second airspace portion 84 of the airspace 80. The air passes over and convectively extracts heat from the heat sinks 41, which conductively extract heat from the base ends 44 of the electrochemical cells 30 through the thermal interface 50 between the base ends 44 and the heat sinks 41. The air vents from second airspace portion 84 through, for example, an opening or vent 88 between the second portion 58 of the hood 54 and the bottom side 34 of the base structure 37 of the housing 31.

Figure 8:
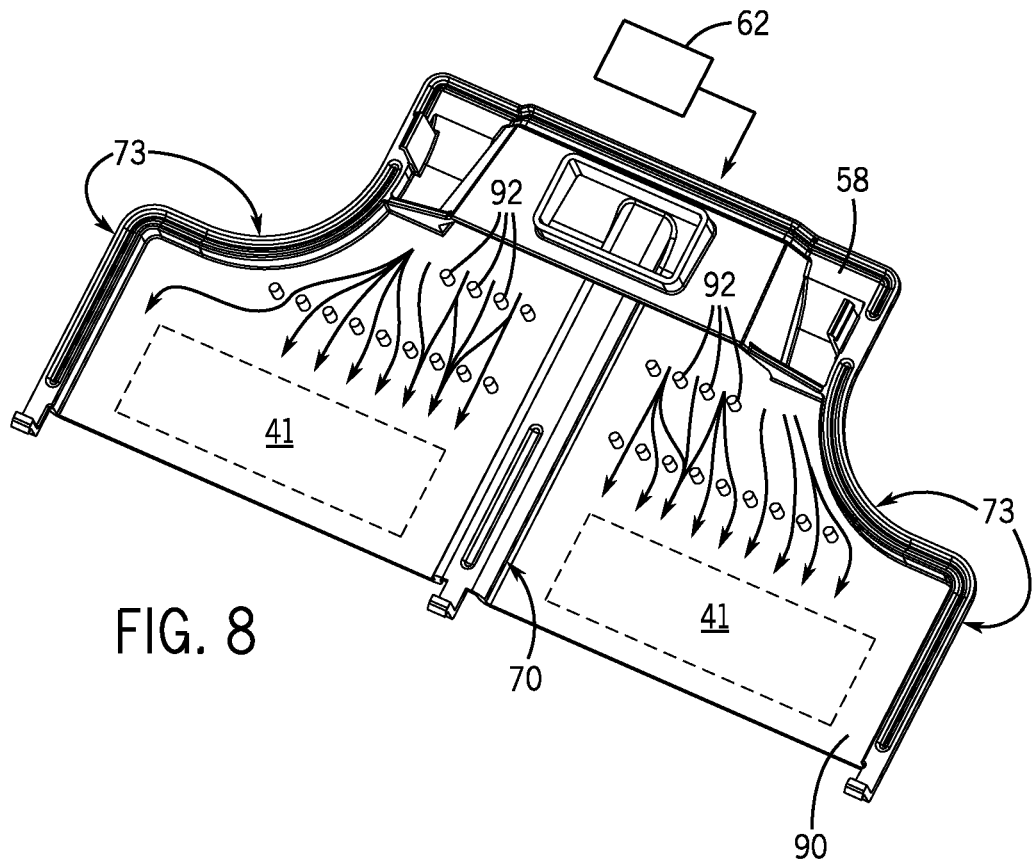
FIG. 8 is a perspective view of a portion of an embodiment of a flow diverting hood or cover for use in the battery module of FIG. 3, in accordance with an aspect of the present disclosure.

In some embodiments, the flow diverting hood 54 includes features configured to redistribute (e.g., disperse, distribute, spread, divide) the airflow before the airflow reaches the heat sinks 41, and/or while the airflow passes over the heat sinks 41. For example, a perspective view of an embodiment of a portion of the hood 54 is shown in FIG. 8. In the illustrated embodiment, the second portion 58 of the hood 54 is shown. In particular, an inside surface 90 of the second portion 58 of the hood 54 is shown. As previously described, the central ridge 70 of the hood 54 is configured to divert the flow away from the middle of the hood 54 (e.g., and toward the heat sinks 41). The outer ridges 73 are configured to contain the airflow under the hood 54. The heat sinks 41 are not shown in the illustrated embodiment, but an area where the heat sinks 41 would be disposed proximate to the hood 54 is indicated via dashed lines on the inside surface 90 of the second portion 58 of the hood 54.

Figure 9:
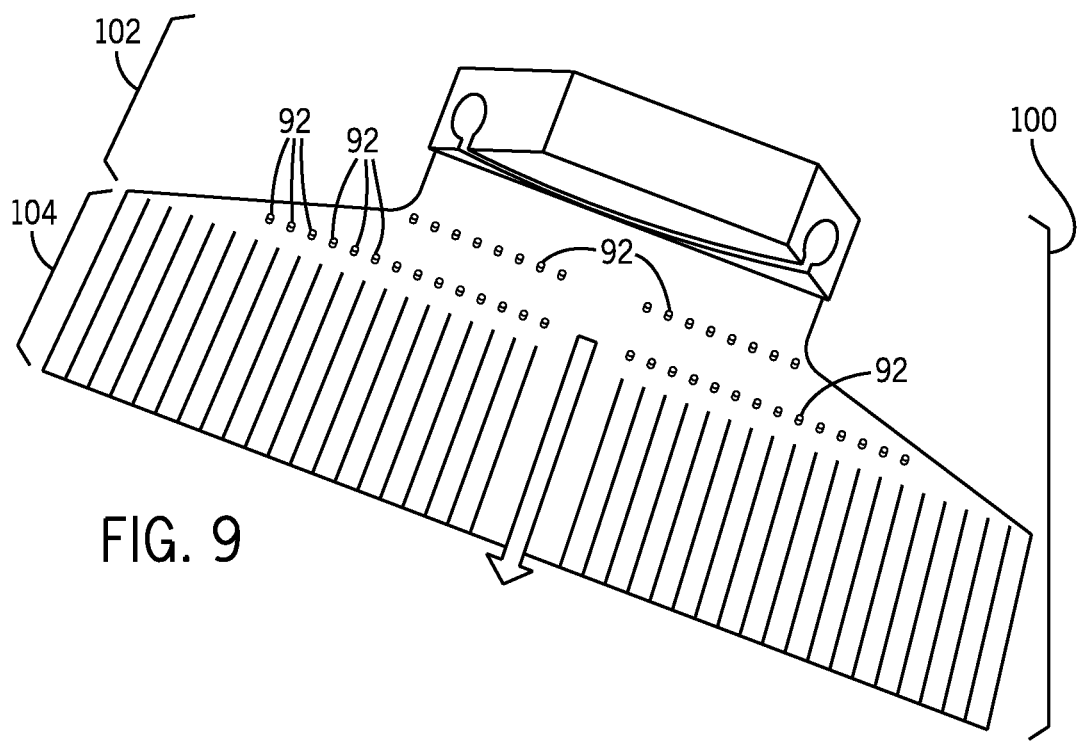
FIG. 9 is a schematic perspective view an embodiment of airflow proximate the flow diverting hood of FIG. 8, in accordance with an aspect of the present disclosure.

The second portion 58 of the hood 54, in the illustrated embodiment, includes extensions 92 (e.g., dispersion extensions, dispersion rods, flow redistribution rods, flow redistribution extensions) extending from the inside surface 90 of the second portion 58 of the hood 54 into the airflow provided by the fan 62. The extensions 92 are configured to redistribute the airflow before the airflow reaches the heat sinks 41. For example, the air may already extract a certain amount of heat from the battery module 20 before the air reaches the heat sinks 41. However, some portions of the battery module 20 proximate to the fan 62, for example, may be hotter than others. Thus, local areas of the air may be heated more so than others. Heat extraction from the heat sinks 41 is generally enhanced by providing thermally homogenous air to the heat sinks 41, such that the heat sinks 41 are evenly cooled (and, thus, the electrochemical cells proximate the heat sinks 41 are evenly cooled). Accordingly, the extensions 92 are configured to at least partially redistribute or interrupt the airflow, such that any heat already extracted by the air is evenly spread to all areas of the air before the air reaches the heat sinks 41. In the illustrated embodiment, the second portion 58 of the hood 54 includes approximately 25 extensions 92. However, the inside surface 90 of the second portion 58 of the hood 54 may include approximately 5 to 50, approximately 10 to 40, approximately 15 to 30, or approximately 20 to 28 extensions 92 extending therefrom. Further, the extensions 92 may be disposed on any internal portion of the hood 54, including the illustrated second portion 58 or the first portion 56 of the hood 54 illustrated in FIGS. 3-7. Further still, the extensions 92 may be disposed immediately proximate to the heat sinks 41, such that the airflow is redistributed while the airflows over the heat sinks 41. A perspective view of an embodiment of an airflow 100 as the air passes over the extensions 92 in FIG. 8 is shown in FIG. 9. For example, in this modeled view, the extensions 92 can be seen as negatives (e.g., holes or openings) in the airflow 100 in a top portion 102 of the airflow 100. The cooling fins 69 of the heat sinks 41 can be seen as negatives (e.g., slots) in the airflow 100 in a bottom portion 104 of the airflow 100. The extensions 92 in the top portion 102 of the airflow 100 are configured to swirl (e.g., mix, disperse, redistribute) the airflow 100 before the airflow 100 reaches the heat sinks 41, which guide the airflow 100 along the cooling fins 69.

In some embodiments, other active (e.g., convective) thermal management features may be included with the battery module 20. For example, back perspective views of an embodiment of the battery module 20 with an evaporator plate 110 disposed on the back side 40 of the base structure 37 of the battery module 20 are shown in FIGS. 10 and 11, where the evaporator plate 110 is partially disassembled (e.g., partially exploded) in FIG. 11. Focusing in particular on FIG. 11, the evaporator plate 110 includes an inlet 112 configured to receive coolant, where the coolant is routed from the inlet 112 through internal passages 114 of the evaporator plate 110. For example, the inlet 112 may be disposed on an extension 115 of a first plate 116 of the evaporator plate 110, where the extension 115 also includes an outlet 118. The coolant may be routed, from a coolant source, to the inlet 112 (shown by arrow 119) and into the internal passages 114, which may be disposed in a second plate 120 of the evaporator plate 110 coupled to the first plate 116. In some embodiments, the internal passages 114 may be defined between the first plate 116 and the second plate 120, where the first plate 116 and the second plate 120 include corresponding indentions that, when aligned, form the internal passages 114. In either configuration, the coolant is routed through the internal passages 114 and may be at least partially vaporized by heat originally extracted from electrochemical cells in the battery module 20 and passed to the coolant. The coolant (e.g., vaporized coolant) is routed from the internal passages 114 to the outlet 118 (shown by arrow 121), and from the outlet back to the coolant source. It should be noted that the coolant may be routed to and from the evaporator plate 110 from any coolant source, where the coolant source supplies the coolant to the evaporator plate 110 and cools the coolant after the coolant has cycled through the evaporator plate 110. For example, the coolant may be managed by a refrigerant cycle or an air conditioning system of the vehicle in which the battery module 20 is disposed. In some embodiments, an auxiliary refrigerant cycle may be utilized for managing the coolant routed through the evaporator plate 110 of the battery module 20.

It should also be noted that the previously described fan 62 and hood 54 (see FIGS. 3-8) may also be utilized in conjunction with the evaporator plate 110 shown in FIGS. 10 and 11. For example, the hood 54 may extend over the evaporator plate 110, such that air is routed over the evaporator plate 110 for cooling the evaporator plate 110.

Further still, it should be noted that the evaporator plate 110 may be configured differently than shown in FIGS. 10 and 11. For example, the inlet 112 and the outlet 118 may be positioned differently. Another embodiment of the evaporator plate 110 is shown in FIG. 12, where the evaporator plate 110 is a single plate with the inlet 112 disposed toward a top 130 of the evaporator plate 110 and the outlet 118 disposed toward a bottom 132 of the evaporator plate 110. The evaporator plate 110 includes the internal passages 114 defined in the evaporator plate 110 to route the coolant from the inlet 112 to the outlet 118.

One or more of the disclosed embodiments, alone or in combination, may provide one or more technical effects useful in the manufacture of battery modules, and portions of battery modules. In general, presently disclosed active (e.g., convective) thermal management features (e.g., fans, blowers, evaporator plates) are configured to cool the battery module (and electrochemical cells thereof). Further, the active thermal management features are generally disposed on the battery module such that they do not substantially contribute to the footprint of the battery module, thereby enabling positioning of the battery module in an allotted space (e.g., cross-sectional area) in the vehicle. The technical effects and technical problems in the specification are exemplary and are not limiting. It should be noted that the embodiments described in the specification may have other technical effects and can solve other technical problems.

While only certain features and embodiments have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the disclosed subject matter. The order or sequence of any process or method steps may be varied or re-sequenced according to alternative embodiments. Furthermore, in an effort to provide a concise description of the exemplary embodiments, all features of an actual implementation may not have been described. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A battery system, comprising:
   a battery module;
   a housing of the battery module, wherein the housing comprises a top side, a lateral side, and an edge extending along and between the top side and the lateral side;
   a plurality of electrochemical cells disposed in the housing;
   a heat sink disposed on the lateral side of the housing;
   a fan disposed over the top side of the housing; and
   a hood comprising a first hood portion disposed over the top side of the housing and the fan and a second hood portion coupled to the first hood portion and disposed over the lateral side of the housing, wherein the hood defines an airspace between the hood and the housing and the hood is configured to guide an airflow through the airspace from the fan on the top side of the housing, over the edge between the top side and the lateral side of the housing, and over the heat sink disposed on the lateral side of the housing;
   wherein the heat sink comprises two thermally conductive plates in-molded with the lateral side of the housing and the two thermally conductive plates are separated by a central portion of the lateral side of the housing, and wherein the second portion of the hood comprises a central ridge disposed proximate to the central portion of the lateral side of the housing and the central ridge is configured to guide the airflow away from the central portion of the lateral side of the housing to the two thermally conductive plates on either side of the central portion.

2. The battery system of claim 1, wherein the hood comprises an opening on a side surface of the hood and the fan comprises an air intake in fluid communication with the opening, wherein the air intake facilitates drawing air into the fan through the opening in the side surface of the hood.

3. The battery system of claim 1, wherein the two thermally conductive plates each comprise a plurality of cooling fins extending therefrom.

4. The battery system of claim 1, wherein the hood comprises outer ridges that extend toward and engage the housing to contain the airflow within the airspace.

5. The battery system of claim 1, wherein the hood comprises a plurality of extensions that extend from an internal surface of the hood toward the housing and within the airspace, wherein the plurality of extensions is configured to redistribute the airflow coming from the fan.

6. The battery system of claim 5, wherein the plurality of extensions is disposed on the first portion of the hood, on the second portion of the hood, or on a combination thereof.

7. The battery system of claim 5, wherein the plurality of extensions is disposed within the airspace upstream of the heat sink.

8. The battery system of claim 5, wherein the plurality of extensions is disposed within the airspace and extending from the second portion of the hood toward the heat sink.

9. The battery system of claim 1, wherein the heat sink is an evaporator plate configured to route coolant therethrough.

10. The battery system of claim 1, wherein the fan is disposed between the hood and a top cover disposed over the top side of the housing.

11. The battery system of claim 1, wherein the plurality of electrochemical cells is disposed into the housing such that base ends of the electrochemical cells opposite to terminal ends of the electrochemical cells are positioned adjacent to the heat sink, wherein the terminal ends of the electrochemical cells comprise terminals.

12. The battery system of claim 11, comprising a thermal layer disposed between the base ends of the electrochemical cells and the heat sink, wherein the thermal layer comprises a thermal gap pad, thermal fillers, thermal adhesives, or thermal paste.

13. The battery system of claim 1, wherein the battery module is configured to be disposed into an allotted surface area of a vehicle such that the lateral side is substantially perpendicular to the allotted surface area.

14. A battery module, comprising:
a housing having a top side, a lateral side, and an edge extending along and between the top side and the lateral side;
electrochemical cells disposed in the housing such that base ends of the electrochemical cells are proximate to the lateral side of the housing, wherein the base ends are opposite to terminal ends of the electrochemical cells and the terminal ends comprise terminals extending therefrom;
a heat sink disposed on the lateral side of the housing proximate to the base ends of the electrochemical cells;
a fan disposed over the top side of the housing; and
a hood comprising a first hood portion disposed over the top side of the housing and the fan and a second hood portion coupled to the first hood portion and disposed over the lateral side of the housing, wherein the hood defines an airspace between the hood and the housing and the hood configured to guide an airflow through the airspace from the fan on the top side of the housing, over the edge between the top side and the lateral side of the housing, and to the lateral side of the housing;
wherein the heat sink is in-molded with the lateral side of the housing, wherein the heat sink comprises two thermally conductive plates disposed on the lateral side of the housing and the two thermally conductive plates are separated by a central portion of the lateral side of the housing, wherein the second portion of the hood comprises a central ridge disposed proximate to the central portion of the lateral side of the housing and the central ridge is configured to guide the airflow away from the central portion of the lateral side of the housing to the two thermally conductive plates on either side of the central portion, and wherein the hood comprises outer ridges that extend toward the housing to contain the airflow within the airspace.

15. The battery module of claim 14, wherein the hood comprises a plurality of extensions that extend from an internal surface of the hood toward the housing and within the airspace, wherein the plurality of extensions is configured to redistribute the airflow coming from the fan, wherein the plurality of extensions is disposed on the first portion of the hood, on the second portion of the hood, or on a combination thereof, and wherein the plurality of extensions is disposed within the airspace upstream of the heat sink, within the airspace and extending from the second portion of the hood toward the heat sink, or a combination thereof.

16. The battery module of claim 14, comprising a thermal layer disposed between the base ends of the electrochemical cells and the heat sink, wherein the thermal layer comprises a thermal gap pad, thermal fillers, thermal adhesives, or thermal paste.

17. A battery module, comprising:
a housing of the battery module, wherein the housing comprises a top side and a lateral side coupled to the top side at an edge;
a heat sink disposed on the lateral side of the housing;
a fan disposed on the top side of the housing; and
a hood comprising a first hood portion disposed over the top side of the housing and the fan and a second hood portion coupled to the first hood portion and disposed over the lateral side of the housing, wherein the hood defines an airspace between the hood and the housing and the hood is configured to guide an airflow through the airspace from the fan on the top side of the housing, over the edge between the top side and the lateral side of the housing, and to the lateral side of the housing, and wherein the hood comprises outer ridges that contact the housing to contain the airflow within the airspace;
wherein the heat sink comprises two thermally conductive plates in-molded with the lateral side of the housing and the two thermally conductive plates are separated by a central portion of the lateral side of the housing, and wherein the second hood portion of the hood comprises a central ridge disposed proximate to the central portion of the lateral side of the housing and the central ridge is configured to guide the airflow away from the central portion of the lateral side of the housing to the two thermally conductive plates on either side of the central portion.

18. The battery module of claim 17, wherein the hood comprises a plurality of extensions extending from an internal surface of the hood into the airspace and the plurality of extensions is configured to swirl or redistribute the airflow.

19. The battery module of claim 18, wherein the plurality of extensions is disposed upstream of the heat sink or proximate to the heat sink.

20. The battery module of claim 18, wherein the plurality of extensions is disposed on the first hood portion, the second hood portion, or a combination thereof.

21. The battery module of claim 17, wherein the heat sink is an evaporator plate configured to route a coolant therethrough.

22. The battery module of claim 17, wherein the first hood portion and the second hood portion are substantially orthogonal to one another.

23. The battery module of claim 17, wherein the first hood portion and the second hood portion are integral.

* * * * *